Feb. 18, 1964 J. L. BOSTWICK 3,121,478
BRAKE ADJUSTING DEVICE
Filed Nov. 20, 1961 2 Sheets-Sheet 1

INVENTOR.
JAMES L. BOSTWICK
BY Paul A. Weilein
ATTORNEY

Feb. 18, 1964   J. L. BOSTWICK   3,121,478
BRAKE ADJUSTING DEVICE
Filed Nov. 20, 1961   2 Sheets-Sheet 2
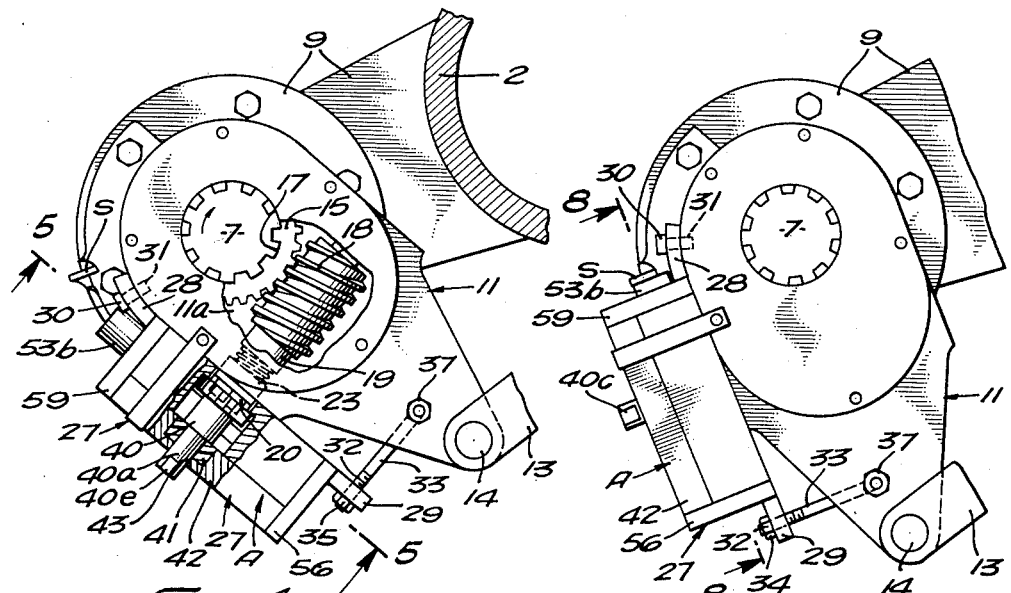
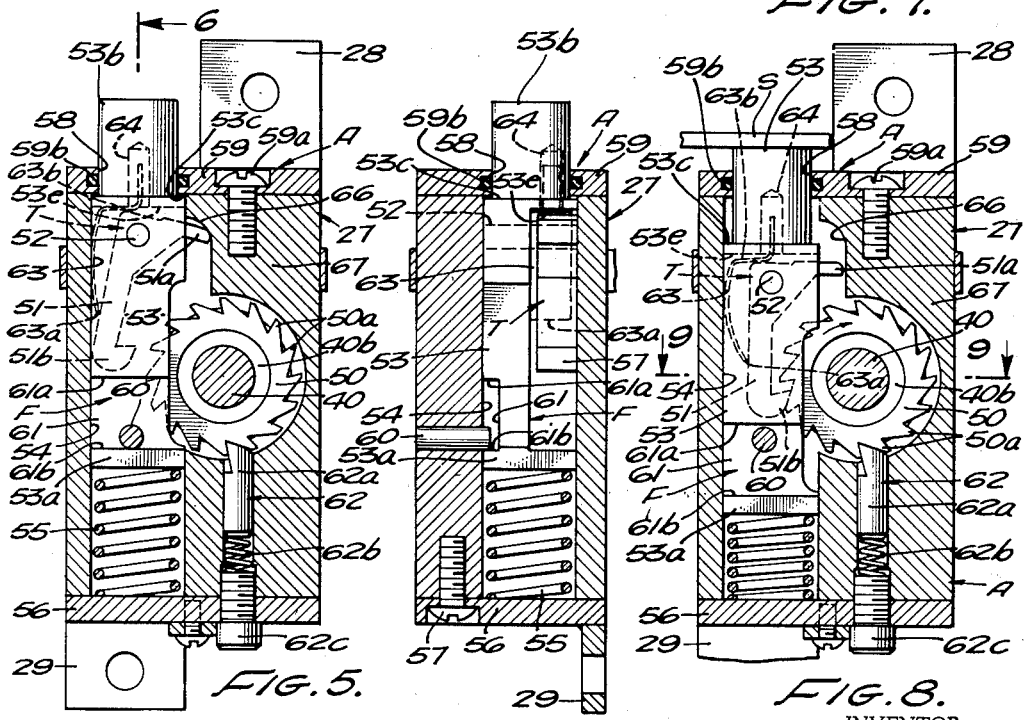
INVENTOR.
JAMES L. BOSTWICK
BY Paul A. Weilein
ATTORNEY United States Patent Office 3,121,478
Patented Feb. 18, 1964

3,121,478
BRAKE ADJUSTING DEVICE
James L. Bostwick, 1501 Bluff Drive,
Santa Barbara, Calif.
Filed Nov. 20, 1961, Ser. No. 153,656
7 Claims. (Cl. 188—79.5)

This invention relates to vehicle brakes for buses, trucks and the like, and more particularly to an improved device for automatically adjusting the brake shoes of such a brake.

In brake units of the type to which this invention relates, particularly conventional air and vacuum operated brakes, the brake shoes of each brake are applied to the brake drum against the action of spring means, by operation of a cam means actuated by a shaft supported by mounting means on an axle or other part of the vehicle. The cam shaft is turned by means of a power operated lever arm with which is associated a manually operable adjusting means for turning the cam shaft to move the cam for adjusting the brake shoes. This brake adjusting means includes a worm and worm gear unit actuated by a rotary adjuster shaft for turning the cam shaft to adjust the cam means as required to compensate for slack. The adjuster shaft is accessible for manual operation on the exterior of the power operated lever arm and is locked against unintentional or accidental turning to hold the cam means in adjusted position by means of a detent movable between a normal position preventing turning of the shaft and a position permitting the shaft to turn.

It is desired that the brake shoes when in released position have minimum clearance from the drum without dragging thereon, since with such clearance a fast application of the brakes may be effected with a short movement of the actuating means therefor. However, due to wear of the shoes and inherent conditions in a brake unit of this nature, slack occurs therein and under these circumstances it becomes necessary for the power operated lever arm to be moved an increasingly greater extent each time the brakes are applied. Should this arm be required to move past center due to brake shoe wear and slack conditions, the leverage is reduced and a lighter application of the brakes takes place. This necessitates use of a greater amount of air or force in an effort to apply the brake but results in a lighter pressure of the shoes on the drum which therefore produces considerable heat. Such heat and diminution of effective air or other actuating pressure has been known to cause brake failure. Thus the ideal condition is to maintain the shoes in position providing for an effective braking action with a minimum amount of travel thereof as well as a minimum expenditure reserve power for actuating the lever arm.

In consideration of the foregoing objections and difficulties present in brakes such as described, it is an object of this invention to provide a simply constructed and compact brake adjusting device which readily may be incorporated with or attached to the adjustable power operated unit of a vehicle brake assembly and will operate automatically to maintain the brake unit properly adjusted for efficient operation throughout the normal life of the brake shoes.

It is another object of this invention to provide a brake adjusting device such as next above noted which includes a simple form of force applying means adapted to be drivingly connected to the adjuster shaft of the manually operable brake adjusting means of a brake unit such as described, and which is movable with the power operated lever arm of the brake unit during operation thereof. With this arrangement the force applying means becomes operable to turn the adjuster shaft for suitably adjusting the brake shoes only in response to a predetermined movement of the power operated lever arm, such as takes place when the brake shoes are worn, or for any other reason undue slack occurs in the brake operating mechanism.

Other objects and advantages of the invention will be hereinafter described or will become apparent to those skilled in the art, and the novel features of the invention will be defined in the appended claims.

Referring to the drawings:

FIG. 4 is an enlarged fragmentary side elevational view partly in section of the brake adjusting device of this invention as applied to the brake unit with a part of the brake unit broken away for clarity of illustration;

FIG. 5 is a sectional view on an enlarged scale taken on the line 5—5 of FIG. 4;

FIG. 6 is a sectional view taken on the line 6—6 of FIG. 5;

FIG. 7 is a fragmentary side elevational view of the structure shown in FIG. 4, showing parts thereof moved to a different position than in FIG. 4;

FIG. 8 is a sectional view on an enlarged scale taken on the line 8—8 of FIG. 7.

Figure 1:
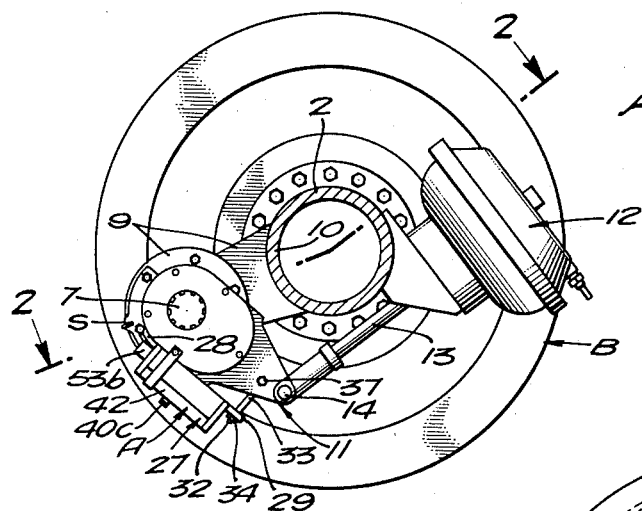
FIG. 1 is a side elevational view of a brake adjusting device embodying the present invention as it would appear when applied to a power operated brake unit supported on a vehicle axle.
Figure 3:
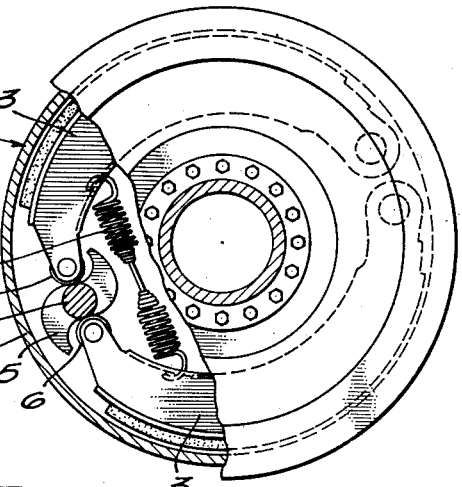
FIG. 3 is a sectional view taken on the line 3—3 of FIG. 2.

In the accompanying drawings a brake adjusting device A embodying the present invention is shown as applied to a conventional air brake unit B. Briefly described, this brake unit includes a brake drum 1 supported on an axle 2, pivotally mounted brake shoes 3 held in releasing position by spring means 4, and cam means including a cam 5 in contact with anti-friction rollers 6 on the shoes. The cam 5 is operable to move the shoes against the drum in applying the brake, by means of a cam shaft 7 journalled in the brake unit B and in a bearing 8 carried by a bracket 9 fixed as at 10 to the axle 2. The cam shaft 7 is driven by a lever arm 11 mounted on the shaft and actuated by an air cylinder unit 12 including a reciprocable driving or piston rod 13, pivoted as at 14 to the outer end of the lever arm 11.

Figure 9:
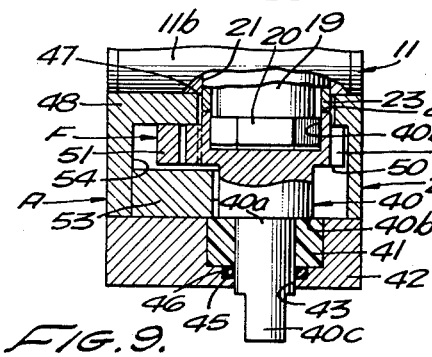
FIG. 9 is a sectional view taken on the line 9—9 of FIG. 8 on a somewhat reduced scale.
Figure 2:
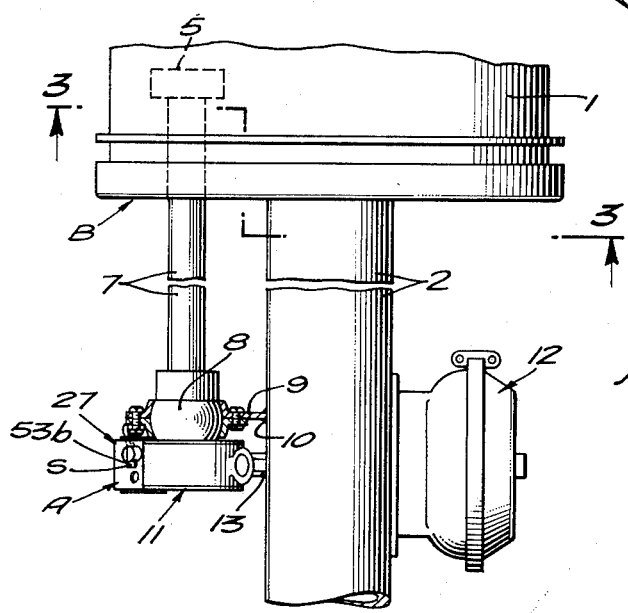
FIG. 2 is a sectional view taken on the line 2—2 of FIG. 1, showing in section an end top plan, the axle and brake unit assembly with the brake adjusting device of this invention applied thereto.

In a brake of the type to which the adjusting device A is applicable, manually operable means are provided to adjust the spacing of the brake shoes with respect to the brake drum to compensate for shoe wear and slack in the brake operating mechanism. One form of such adjusting means generally employed, as here shown in FIG. 4, is embodied in the lever arm 11 and includes an annular worm gear 15 rotatably supported in suitable bearing means, not shown, in the hollow interior portion 11a of the lever arm 11 and splined as at 17 on the cam shaft 7, so as to hold the arm on the shaft. A worm 18 meshing with the worm gear 15 is mounted on an adjuster shaft 19 suitably journalled in the hollow interior 11a of the lever arm 11. The adjuster shaft 19 is accessible for manual operation on the exterior of the lever arm 11 and has a head 20 of non-circular cross section on the outer end thereof. The head 20 is exposed in an opening 21 in the side wall 11, as shown in FIG. 9, so that a socket wrench or other suitable tool, not shown, may be applied thereto for turning the shaft to adjust the release position setting of the brake shoes and thereby adjust the brake unit.

Means are provided to lock the adjuster shaft 19 against unintentional turning movement to assure that the shoes will be maintained in the desired adjusted position as to drum clearance when in releasing position. Since this means is conventional only a part thereof is shown and such part consists of a locking sleeve 23 axially movable on the adjuster shaft 19 and suitably non-rotatable keyed held or engaged in the opening 21. The bore of the sleeve 23 is of non-circular cross section conforming to that of the head 20 of the shaft 19. Spring means, not shown, biases the sleeve normally to a position overlying the head 20 and thereby holding the shaft 19 against turning. When it is desired to apply a socket wrench or tool to the head 20 for adjusting the position of the brake shoes, a wrench or other tool is fitted on the head and pushed inwardly to axially shift the sleeve 23 out of contact with the head 20, whereby the shaft may be turned to effect the desired brake shoe adjustment. On withdrawal of the wrench, the spring-loaded locking sleeve 23 moves axially outwardly to encompass the head 20 and lock the shaft 19 against turning. The outward extension of the head 20 as here shown, makes it possible as will be hereinafter described to attach to the brake unit B, the adjusting device A embodying this invention.

The adjusting device A includes a sectional rectangular housing 27 constructed to facilitate the assembling therein of force applying means F which is operable to effect a predetermined adjustment of the adjuster shaft 19 of the brake unit B when, as here shown, the device A is connected with the brake unit and the latter is operated in a particular manner as the result of wear of the brake shoes and slack in the operating means of the unit.

Attachment of the brake adjusting device A to the lever 11 of the brake unit B may be effected in any suitable manner provided the force applying means F in the housing 27 is operatively coupled to the adjuster shaft 19 on the arm 11 and the device A will move with the arm 11 when the brake unit is actuated.

As here shown the housing 27 is provided at its ends with apertured mounting ears 28 and 29, and the ear 28 is secured to the arm 11 by means of a suitable threaded fastening 30. The fastening 30 is extended through the aperture in the ear 28 and threaded into a tapped hole 31 in the arm 11. The other apertured ear 29 has the threaded end 32 of an angular bolt 33 extended therethrough and held thereon by a nut 34. The other end portion of the bolt 33 is pivotally mounted on the arm 11 and held thereon by a nut 37.

The means here shown for mounting the housing 27 on the arm 11 enables the housing to be positioned so that trigger means T of the force applying means F, will engage a strike arm S fixed on the bracket 9 carried by the axle 2, and thereby cause the force applying means to effect a predetermined adjustment of the brake shoes relative to the brake drum. This adjustment will take place however only when a greater than usual amount of movement of the lever arm 11 takes place in moving the brake shoes against the drum, as a result of wear of the shoes and slack in the means for actuating the shoes.

The force applying means F as here shown includes a shaft 40 journalled between its ends in a bearing 41 in wall 42 of the housing 27, the journalled portion 40a of the shaft being reduced to define a shoulder 40b which abuts the bearing 41. This reduced portion 40a extends through an opening 43 in the housing wall 42 and is provided with an outer end 40c of non-circular cross section, whereby a suitable wrench or tool not shown, may be applied thereto for manual adjustment of the shaft for adjusting the brake. A ring seal 45 is provided around the shaft portion 40a being seated in a recess 46 in the wall 42.

The shaft 40, as shown in FIG. 9, has an enlarged outer end in the form of a socket 40d disposed in an opening 47 in the wall 48 of the housing 27, so that it may be fitted over the head 20 on the adjuster shaft 19 on the arm 11 when mounting the adjusting device A on the arm 11. The interior of the socket 40d is of non-circular cross section so as to conform to that of the head 20 for driving the adjuster shaft 19 upon rotation of the shaft 40.

The spring loaded locking sleeve 23 that normally holds the adjuster shaft 19 against rotation, will be engaged by the outer end 40e of the socket portion 40d of the shaft 40 and pushed axially inwardly to release the shaft 19, when the socket portion 40d is fitted, as best shown in FIG. 9, over the head 20 pushed inward as required to drivingly connect the shafts 40 and 19 upon fixing device A on the arm 11.

The force applying means F also includes a ratchet wheel 50 fixed on the shaft 40 around the socket portion 40d and here shown as integral with the socket 40d and in inwardly spaced relation to the outer end 40e of the shaft 40, whereby this end may enter the opening 21 to engage and push inwardly to releasing position the locking sleeve 23.

The ratchet wheel 50 is turned by means of a pawl 51 pivoted as at 52 on a spring loaded plunger 53 of non-circular cross section mounted in the housing 27. The inner end 53a of the plunger 53 is guided in a bore 54 of non-circular cross section formed between walls of the housing 27, there being a coiled expansion spring 55 confined in the bore 54 between the end 53a of the plunger and an end wall 56 of the housing. The end wall 56 is held in place by means of a suitable fastening 57.

The outer end 53b of the plunger 53 is cylindrical and extends outwardly through an opening 58 in the removable end wall 59 of the housing 27, under the force of the spring 55, there being a shoulder 53c disposed on the plunger for abutting the end wall 59 to limit such outward movement of the plunger. Since the spring 55 is normally compressed somewhat to maintain the end 53b extended from the housing 27, a stop pin 60 is fixed within the housing and extends into a recess 61 in the plunger 53 so as to engage shoulders 61a and 61b at opposite ends of the recess to limit inward and outward movement of the plunger. Limiting of inward movement of the plunger 53 prevents damage of the spring 55 and the limiting of the outward movement of the plunger is desired to maintain it in the housing 27 when for any reason the end wall 59 held in place by the fastenings 59a, is removed. The end wall 59 may be a sealing ring 59b to form a seal around the cylindrical portion 53b of the plunger to exclude the entrance of dirt into the housing 27 around the plunger 53.

A spring loaded detent 62 is mounted in a wall of the housing so as to engage the ratchet wheel 50 to prevent retrograde movement of the ratchet wheel. This detent 62 makes it possible to fully release the brakes without removing the brake adjusting device from the brake arm 11, complete release of the brakes being necessary for removal of the hub and wheel assembly for repacking wheel bearing seals or replacing parts. Accordingly, the spring loaded detent 62 includes a detent plunger 62a urged into contact with the ratchet wheel 50 by a spring 62b. An adjusting screw 63c engages the spring to place it under tension. Loosening or removal of the screw 63c will relieve the spring load on the plunger 62a so that the shaft 40 with the ratchet 50 may be turned as necessary to fully release the brakes for the purposes above stated.

The trigger means T previously referred to includes the extended end 53b of the plunger 53, and means associated with the pawl 51 for causing the pawl to be moved into position for drivingly engaging the ratchet wheel 50 only when the operating arm 11 of the brake unit B moves sufficiently to cause the strike arm S on the bracket 9 to engage the end 53b of the plunger and thereby move the plunger from the position shown in FIG. 5 into the position shown in FIG. 8. Accordingly, resilient means in the form of a leaf spring 63, as shown in FIG. 5, has one end mounted on a bore 64 in the cylinder end 53b of the plunger, and is provided with an end portion 63a which bears against the pawl 51 to bias it toward the ratchet wheel 50. The portion 53d of the plunger 53 disposed between the cylindrical outer end 53b and the inner end portion 53a, is reduced and laterally offset with respect to the axis of the bore 64 in the cylinder portion 53b. This formation provides a shoulder 53e on the plunger 53 which is engaged by an offset portion 63b of the spring 63. The upper end of the pawl 51 is beneath the offset portion 63b of the spring 63 and prevents dislodgement of the spring.

The trigger means T operates to hold the pawl 51 against movement into driving engagement with the ratchet wheel 50 until the plunger 53 has moved a predetermined extent inwardly, then releases the pawl. Accordingly, the trigger means T includes a trip arm 51a extending laterally from the pivoted end of the pawl 51, so that when the plunger 53 is in the extended position shown in FIG. 5, the outer end of this arm will abut a curved stop shoulder 66 formed on the wall portion 67 of the housing 27, and thereby hold the pawl against movement toward the ratchet wheel 50.

Upon inward movement of the plunger 53 an extent less than that shown in FIG. 8, the trip arm 51a will move clear of the curved stop shoulder 66, and the pawl 51 will be moved by the leaf spring 63 toward the ratchet wheel 50, but the teeth 50a on this wheel and the rounded hook end 51b of the pawl 51 are so constructed that the hook end 51b will not hook into driving engagement with one of the teeth 50a. Movement of the plunger the extent shown in FIG. 8 is necessary before the hook end 51b of the pawl 51 will be drivingly engaged with the ratchet wheel. With this arrangement, when the brake is released and the arm 11 moves in a direction away from the strike arm S, the plunger 53 will be forced outwardly by the spring 63. If the pawl 51 is not drivingly engaged with the ratchet wheel it will move freely past the ratchet wheel 50 and no adjustment of the brake shoes will take place.

When, however, the brake shoes are worn or for any other reason slack occurs in the brake unit, such that the lever arm 11 moves a greater than usual extent to applying the shoes to the brake arm, then the end 53b of the plunger is engaged with the strike arm S and the plunger 53 is moved inwardly as shown in FIG. 8, an extent causing the pawl 51 to be drivingly engaged with the ratchet wheel 50. Upon release of the brake, the arm 11 moves away from the strike arm S and the spring 55 then moves the plunger 53 outwardly so that the ratchet wheel 50 will be turned as the pawl 51 moves outwardly with the plunger and is finally disengaged from the ratchet wheel as the plunger reaches the extended position shown in FIG. 5. As the trip arm 51a on the pawl contacts the curved stop shoulder 66, the pawl is swung into the position shown in FIG. 5, and so held.

When the ratchet wheel 50 is turned by the pawl 51, the shaft 40 is likewise turned and through the socket 40d drives the adjuster shaft 19. The shaft 19 through the worm 18 and worm gear 15, causes the cam shaft 7 to be turned so that the cam 5 will move to permit the brake shoes 3 to move closer to the drum, to compensate for the slack caused by means of the shoes.

The stroke of the plunger 53 and the construction and arrangement of the pawl 51 and ratchet wheel 50 are such that when the ratchet wheel is turned for adjusting the brake unit, the brake shoes 3 will be set close to the drum 1 without contact with the drum. In other words, the force applying means F as embodied in the adjusting device A is calibrated so that desired adjustment of the brake shoes will take place only following an operation of the brake unit which required movement of the lever arm 11 an extent causing the strike arm S to move the plunger 53 for effecting a shoe adjusting movement of the ratchet wheel 50 and associated elements.

After the one adjustment, the device will not make a further adjustment of the brake until slack occurs again in the brake unit. It is conceivable however that it is possible that so much slack could occur in the brake unit that more than one operation of the force applying means F of the device would take place before the brake shoes are properly set to compensate for such slack.

It will now be apparent that a brake adjusting device embodying the present invention readily and easily may be embodied in or attached to a conventional vehicle brake unit, and in response to an actuation of the brake unit such as takes place when the brake shoes are worn or for any other reason, slack occurs in the operating mechanism of the brake, will operate to adjust the shoes and maintain them properly adjusted throughout the life thereof. Among the advantages achieved by this operation of the adjusting device are maintaining a minimum but effective amount of brake shoe clearance from the drum at all times, a faster braking action, conservation of compressed air or other stored actuating force for operating the brake, a reliable and positive brake action and provision for manually adjusting the brake shoes by appropriate manipulation of the exposed end 40c of the shaft 40.

I claim:

1. In a brake adjusting device; a housing; a spring-loaded plunger in said housing movable in one direction in response to a force opposing the force of the spring and movable in the opposite direction by the spring upon removal of said force; a rotatable shaft in said housing; means on said shaft affording a driving connection with brake adjusting means of a brake unit; operating means in said housing for effecting a predetermined rotative movement of said shaft in one direction in response to movement of said plunger in said opposite direction; detent means normally preventing rotation of said shaft in the other direction; said detent means being releasable; said shaft having one end extended from said housing and having a tool engaging portion thereon whereby said shaft may be rotated manually in either direction upon release of said detent means.

2. A brake adjusting device comprising: a member movable in one direction in response to a force applied thereto; a housing supporting said movable member; means operatively connected with said member and said housing operable to apply a force to move said member in the opposite direction upon removal of said first named force from said member; a shaft rotatable in said housing; means on said shaft adapted to form a drive connection with adjusting means of a brake unit; a ratchet wheel drivingly connected with said shaft; pawl means on said movable member operable to turn said ratchet wheel in one direction only upon movement of said movable member in said opposite direction; and detent means in said housing engaging said ratchet wheel to prevent rotation of said shaft in the other direction; said shaft having one end acessible from outside said housing and having a tool engaging portion thereon for manual rotation in either direction upon release of said detent means.

3. A brake adjusting device comprising: a member movable in one direction in response to a force applied thereto; a housing supporting said movable member; means operatively connected with said member and said housing operable to apply a force to move said member in the opposite direction upon removal of said first named force from said member; a shaft rotatable in said housing; means on said shaft for effecting a drive connection with adjusting means of a brake unit; a ratchet wheel drivingly connected with said shaft; a pawl pivoted on said movable member; resilient means biasing said pawl toward said ratchet wheel; means on said pawl and said housing respectively cooperable to restrain movement of said pawl toward said ratchet wheel when said movable member is in predetermined positions and to release said pawl for movement into driving engagement with said ratchet wheel when said movable member is in other predetermined positions; said pawl operating to effect an increment of rotation of said ratchet wheel in one direction upon movement of said movable member in said opposite direction; detent means engaging said ratchet wheel to hold said shaft against rotation in the other direction; means manually operable for releasing said detent means; said shaft having a portion disposed outside said housing and provided with a tool engaging portion thereon for manual operation whereby the shaft may be rotated in either direction upon release of said detent means.

4. In a brake adjusting device; a housing; means for mounting said housing for movement with the brake operating arm of a brake unit; a stationary strike member in the path of movement of said housing; a spring-loaded plunger in said housing movable in one direction in response to contact of said plunger with said strike member and movable in the opposite direction by the spring upon removal of said plunger from contact with said strike member; a rotatable shaft in said housing; said brake unit including brake adjusting means carried by said arm; means on said shaft affording a driving connection with said brake adjusting means of said brake unit; and operating means in said housing for effecting a predetermined rotative movement of said shaft in response to movement of said plunger in said opposite direction; said shaft having an end portion extending outwardly from said housing for manual operation to turn said shaft.

5. In a brake adjusting device; a housing; means for mounting said housing for movement with the brake operating arm of a brake unit wherein said arm is provided with brake adjusting means; a spring-loaded plunger in said housing movable in one direction in response to a force opposing the force of the spring and movable in the opposite direction by the spring upon removal of said force; a stationary strike member disposed to engage and apply said force to said plunger upon a predetermined movement of said operating arm; a rotatable shaft in said housing; means on said shaft affording a driving connection with said brake adjusting means; operating means in said housing for effecting a predetermined rotative movement of said shaft in response to movement of said plunger in said opposite direction; and stop means for limiting movement of said plunger in both directions.

6. In combination with a brake unit having a brake drum; brake shoes; means for moving the shoes into and from braking engagement with the drum including an operating arm movable in opposite directions for such purpose; and adjustment means rotatable in the unit and cooperable with said operating means for changing the spacing of the shoes from the drum while the shoes are free from contact with the drum; a housing carried by said operating arm; a strike member carried by said brake unit; a plunger reciprocable in said housing with one end disposed to engage said strike member to move said plunger in one direction in response to a predetermined movement of said arm in a direction in which said operating means moves said shoes against said drum; spring means in said housing operable to move said plunger in the opposite direction in response to movement of said arm in a direction in which said shoes are moved from the drum; a rotary shaft in said housing; means on said shaft drivingly coupled to said adjusting means; and means in said housing operatively connected with said plunger and said shaft operable for effecting a predetermined rotative movement of said shaft in response to movement of said plunger in said opposite direction.

7. In combination with a brake unit having a brake drum; brake shoes; means for moving the shoes into and from braking engagement with the drum including an operating arm movable in opposite directions for such purpose; and adjustment means rotatable in the unit and cooperable with said operating means for changing the spacing of the shoes from the drum while the shoes are free from contact with the drum; a housing carried by said operating arm; a strike member carried by said brake unit; a plunger reciprocable in said housing with one end disposed to engage said strike member to move said plunger in one direction in response to a predetermined movement of said arm in a direction in which said operating means moves said shoes against said drum; means operable in said housing to move said plunger in the opposite direction when said arm moves in brake releasing direction; and means carried by said housing and connected with said adjusting means operable in response to movement of said plunger in said opposite direction to rotate said adjusting means for adjusting said brake shoes.

References Cited in the file of this patent

UNITED STATES PATENTS

| | | |
|---|---|---|
| 1,505,938 | Adreon et al. | Aug. 26, 1924 |
| 2,223,043 | Miller | Nov. 26, 1940 |
| 2,554,064 | Shields | May 22, 1951 |
| 2,554,065 | Shields | May 22, 1951 |
| 2,752,009 | MacDougall | June 26, 1956 |